(12) United States Patent (10) Patent No.: US 12,567,985 B1

Burton (45) Date of Patent: Mar. 3, 2026

(54) SYSTEM AND METHOD FOR AUTHENTICATING A USER TO A THIRD PARTY BASED ON ONE OR MORE WORDS FROM A WORD LIST

(71) Applicant: Eckoh UK Limited, Hemel Hempstead (GB)

(72) Inventor: Ashley Burton, Watford (GB)

(73) Assignee: Eckoh UK Limited, Hemel Hempstead (GB)

( * ) Notice: Subject to any disclaimer, the term of this patent is extended or adjusted under 35 U.S.C. 154(b) by 0 days.

(21) Appl. No.: 18/945,260

(22) Filed: Nov. 12, 2024

(30) Foreign Application Priority Data

Oct. 29, 2024 (GB) ...................................... 2415919

(51) Int. Cl.
H04L 9/32 (2006.01)

(52) U.S. Cl.
CPC ............ H04L 9/3271 (2013.01); H04L 9/321 (2013.01)

(58) Field of Classification Search
CPC .............................. H04L 9/3271; H04L 9/321
USPC ......................................................... 713/168
See application file for complete search history.

(56) References Cited

U.S. PATENT DOCUMENTS

| | | | |
|---|---|---|---|
| 5,892,470 A | 4/1999 | Kusnick | |
| 6,757,654 B1 | 6/2004 | Westerlund et al. | |
| 7,434,061 B2 | 10/2008 | Moseley | |
| 7,552,469 B2 | 6/2009 | Diffie et al. | |
| 10,114,860 B1 | 10/2018 | Wittenstein | |
| 10,397,196 B2 * | 8/2019 | Kaplan Haelion | .......................... H04L 61/5014 |
| 2003/0046556 A1 * | 3/2003 | Attwater | .......... G06Q 20/40145 705/64 |
| 2009/0313269 A1 * | 12/2009 | Bachmann | ............ H04L 9/3236 |
| 2011/0087995 A1 | 4/2011 | Naccache | |
| 2018/0197169 A1 * | 7/2018 | Ogle | ................ G06Q 20/38215 |
| 2019/0259376 A1 * | 8/2019 | Kim | ........................ G10L 15/04 |
| 2021/0081923 A1 | 3/2021 | Rafferty | |
| 2022/0300599 A1 * | 9/2022 | Farrelly | ................. G06F 21/36 |

FOREIGN PATENT DOCUMENTS

| | | |
|---|---|---|
| WO | 2001/69544 A1 | 9/2001 |
| WO | 2014170646 A1 | 10/2014 |
| WO | 2016110454 A1 | 7/2016 |

(Continued)

OTHER PUBLICATIONS

PGP Word List, Wikipedia The Free Encyclopedia, 8 pages (Aug. 16, 2024).

(Continued)

*Primary Examiner* — Moeen Khan

(74) *Attorney, Agent, or Firm* — Hamilton, Brook, Smith & Reynolds, P.C.

(57) ABSTRACT

A method of authenticating a user to a third party using a computing device is disclosed, the method comprising: receiving an input comprising one or more words from the user; obtaining an identification number corresponding to the one or more words; transmitting the identification number to a third party device associated with the third party; and receiving a message from the third party device that indicates whether or not the identification number corresponds to a valid identity. A suitable system and computer program for implementing the method are also disclosed.

12 Claims, 9 Drawing Sheets

(56) References Cited

FOREIGN PATENT DOCUMENTS

| | | | |
|---|---|---|---|
| WO | 2016110455 | A1 | 7/2016 |
| WO | 2023/081962 | A1 | 5/2023 |

OTHER PUBLICATIONS

Palatinus, M., et al., "Mnemonic code for generating deterministic keys," Bitcoin/bips, BIP:39, pp. 1-5 (2013).

Human-readable wallet addresses ?; Retrieved from the internet: https://www.reddit.com/r/CryptoTechnology/comments/nemjm3/humanreadable_wallet_addresses/; Crypto Technology Reddit: Dec. 2020.

European Search Report for Application No. 25210222.3, date of mailing Jan. 22, 2026.

* cited by examiner

300

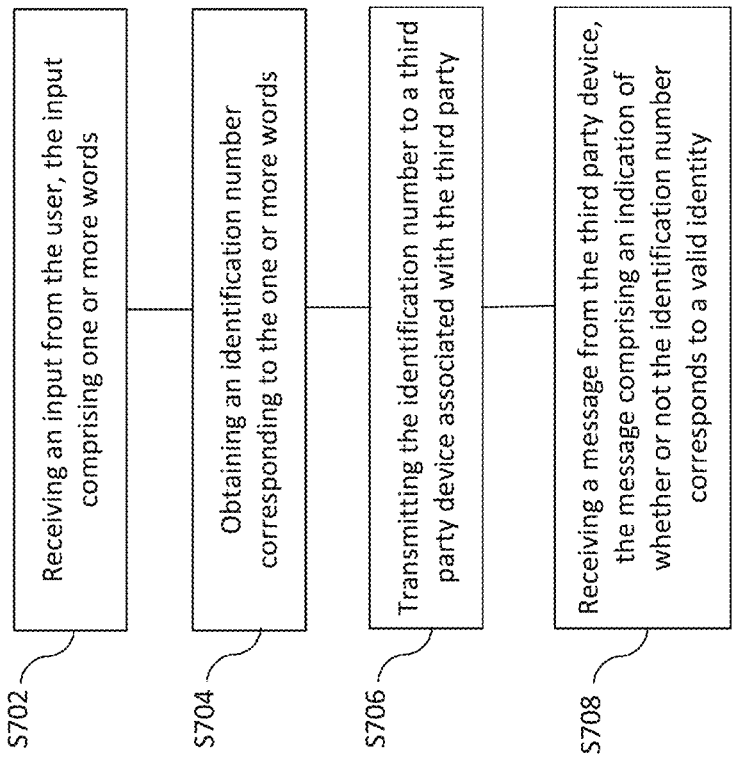

FIG. 7

S702 — Receiving an input from the user, the input comprising one or more words

S704 — Obtaining an identification number corresponding to the one or more words S706 — Transmitting the identification number to a third party device associated with the third party S708 — Receiving a message from the third party device, the message comprising an indication of whether or not the identification number corresponds to a valid identity

700

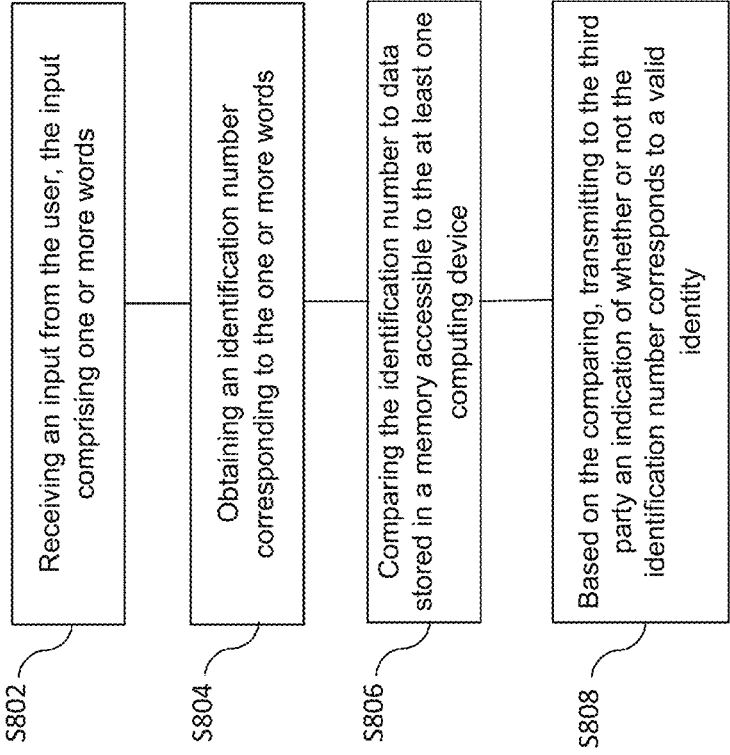

S802    Receiving an input from the user, the input comprising one or more words S804    Obtaining an identification number corresponding to the one or more words S806    Comparing the identification number to data stored in a memory accessible to the at least one computing device S808    Based on the comparing, transmitting to the third party an indication of whether or not the identification number corresponds to a valid identity

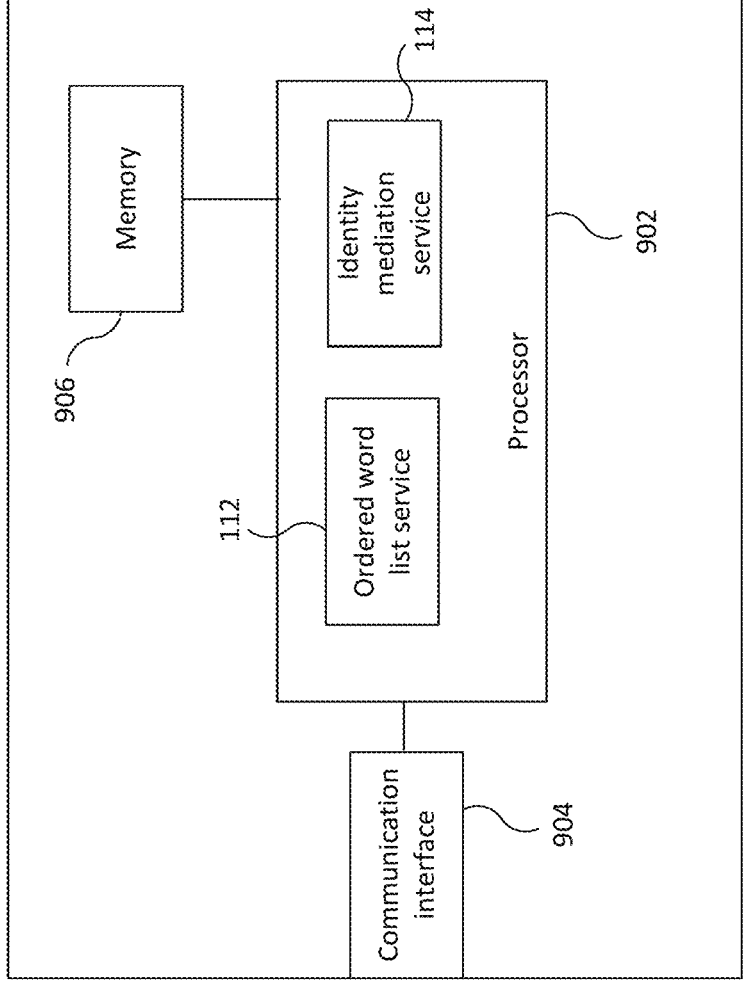
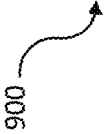
FIG. 9

SYSTEM AND METHOD FOR AUTHENTICATING A USER TO A THIRD PARTY BASED ON ONE OR MORE WORDS FROM A WORD LIST

RELATED APPLICATION

This application claims priority under 35 U.S.C. § 119 or 365 to United Kingdom Application No. 2415919.6, filed Oct. 29, 2024. The entire teachings of the above application are incorporated herein by reference.

FIELD OF THE INVENTION

The invention generally relates to user authentication, in particular user authentication based on word lists.

BACKGROUND TO THE INVENTION

Customers regularly interact with automated self-service solutions and with agents in contact centers in order to manage and make use of commercial, government or healthcare services. Modern authentication methods typically require multiple factors that include an identifier along with one or more factors to prove the customer's identity, for example an account password, date of birth, postal code or zip code, last 4 digits of a bank account or payment card.

Typically, in the course of an interaction the customer is required to assert an identifier that represents themselves (e.g. a social security number), an account held singularly or jointly (e.g. a bank or utility account), a payment instrument (e.g. a payment card), physical asset (e.g. a parcel) or virtual asset (e.g. a gift voucher, cryptocurrency wallet). These identifiers often involve a numeric or alphanumeric reference (e.g. account number, patient ID, invoice number, vehicle registration, license number, policy number, etc.).

SUMMARY OF THE INVENTION

The inventors have recognised that managing a growing number of numeric or alphanumeric references relating to different services can be challenging. Additionally, it is common for customers not to know their account number or identifier since it is often a procedurally generated by an organization's internal systems and is therefore not memorable. Failure to correctly identify the customer during automated journeys frequently requires a "drop out" or transfer from the authentication procedure to a contact center agent. This creates customer frustration and results in an increased computational burden. For example, creating a new communication session between the customer and the agent requires network and processor resources to be used. Furthermore, failure to correctly identify the customer during an agent led interaction typically means that contacts take longer to serve, again increasing network resource consumption and reducing customer satisfaction.

The transmission of complex numeric and alphanumeric references is often most challenging in scenarios where voice is the channel over which the customer is communicating, such as automated telephone services, Al-based voice virtual agent interactions, voice assistants and virtual reality/metaverse applications. In these scenarios, long reference numbers are challenging and it would be far more effective for a customer to use a simpler and more memorable means of identifying themselves.

The inventors have recognized that the use of long numeric or alphanumeric references as identifiers is not conducive to an engaging and efficient customer experience, nor are the resulting identifiers easily memorable, especially in the context of infrequent use. The authentication factors used to validate an identity may be more memorable since they are typically passwords or PINs set by the customer or personal information that the customer knows about themselves (e.g. date of birth, postcode, etc.). That said, it is increasingly common for authentication mechanisms to use time based one-time password (TOTP) generators, potentially introducing an additional non-intuitive numeric verification step.

A failure to efficiently identify a customer results in increased friction, decreased customer satisfaction and additional network resource consumption in transferring customers to contact center agents to manually verify a customer's identity. As such, it is in the interest of both the customer and organizations to improve the performance of identification processes. It is with these considerations in mind that aspects of the present disclosure have been developed.

According to an aspect of the present disclosure, there is provided a method of authenticating a user to a third party, the method performed by at least one computing device and comprising: receiving an input from the user, the input comprising one or more words; obtaining an identification number corresponding to the one or more words; transmitting the identification number to a third party device associated with the third party; and receiving a message from the third party device, the message comprising an indication of whether or not the identification number corresponds to a valid identity.

It is noted that, throughout this disclosure, the term "identification number" is intended to cover any alphanumeric or other string in use as an identifier.

An advantage of this method is that an ordered word list (OWL) is generally much more memorable for the user than an identification number. For example, using methods described herein, a 6-digit identification number may be replaced by 2 words drawn from a 1024-word master dictionary. The chance of the user forgetting their unique identifier is therefore greatly reduced. Additionally, OWLs may be easier for the user to recognise, and to recite clearly and accurately, than alphanumeric strings. These improvements accordingly reduce the average time taken for user interactions and reduce the risk of failure to authenticate, improving the user experience.

A further advantage is that the third party need not have any knowledge of the OWL, as the identification number is obtained and transmitted to the third party. This method therefore allows the benefits of easier memorisation to be achieved without altering an existing customer information system based on identification numbers.

It is further noted that, in embodiments where speech recognition is used to process the one or more words of the user input, OWLs are generally likely to be easier for speech recognition software to recognise than alphanumeric strings or identification numbers, further increasing the likelihood of successful authentication as promptly as possible.

If the indication indicates that the identification number is valid, the method may further comprise: outputting an authentication challenge for the user, the authentication challenge based on information included in the message from the third party device; receiving a user response to the authentication challenge; transmitting the user response to the third party device; and receiving a further message from the third party device, the further message comprising a further indication of whether or not the user has been successfully authenticated as being associated with the valid identity.

Obtaining the identification number may comprise processing the one or more words and an obfuscation factor.

This has the advantage that a malicious party obtaining the OWL will have more difficulty in decoding the OWL to obtain the identification number. In particular, even if the malicious party also obtains the OWL dictionary from which the OWL was prepared, if they do not have an indication of the obfuscation factor they may not be able to decode the OWL.

The obfuscation factor may be dependent on an identity of the third party.

The obfuscation factor may be dependent on an identity of the user.

The obfuscation factor may be unique to a particular communication session between the user and the third party.

The obfuscation factor may be valid for a predetermined time window.

The above four options all have the advantage of increasing the difficulty of a malicious party determining what obfuscation factor was used, thereby increasing the security of communication.

The input may comprise an automated speech recognition result recorded during a communication session between the user and the third party.

As noted above, automated speech recognition is particularly advantageous for use with OWLs, as OWLs are generally likely to be more quickly and accurately recognised by speech recognition software than, for example, an alphanumeric string.

The method may further comprise determining that the automatic speech recognition result meets predetermined confidence criteria.

The input may comprise text.

An advantage of text-based implementations is that the uncertainty of speech recognition can be avoided. Additionally, text-based interfaces such as web chats may allow words typed by a user to be auto-completed based on knowledge of the dictionary of words allowed to be in an OWL (the OWL dictionary described below with reference to FIG. 3).

The input may be provided by the user during a communication session with the third party.

The communication session may be a voice-based communication session.

The communication session may be an instant messaging communication session.

The method may further comprise evaluating a checksum associated with the list of words to determine whether or not the list of words corresponds to a valid identification number.

The checksum may be either or both of a numerical checksum or a check-word (both are described below).

The checksum has the advantage of increasing the certainty of correctly identifying the OWL provided by the client. For example, speech recognition errors, transmission errors, and/or typographical errors may be more easily detected.

Obtaining the identification number may comprise confirming that each word in the list of words appears in a predetermined set of words stored in a memory accessible by the computing device, wherein the predetermined set of words is in compliance with one or more predefined criteria.

One of the predefined criteria may be that the predetermined set of words lacks homophones.

One of the predefined criteria may be that the predetermined set of words lacks homographs.

The above two options have the advantage of reducing the risk of words in the OWL being confused by the user, thereby reducing the risk of memory error or miscommunication.

According to a further aspect of the present disclosure there is provided a computing device for authenticating a user to a third party, the computing device comprising a processor configured to: receive an input from the user, the input comprising one or more words; obtain an identification number corresponding to the one or more words; transmit the identification number to a third party device associated with the third party; and receive a message from the third party device, the message comprising an indication of whether or not the identification number corresponds to a valid identity.

According to a further aspect of the present disclosure there is provided a computer program for authenticating a user to a third party, the computer program containing instructions that, when executed by a processor of a computing device, cause the computing device to: receive an input from the user, the input comprising one or more words; obtain an identification number corresponding to the one or more words; transmit the identification number to a third party device associated with the third party; and receive a message from the third party device, the message comprising an indication of whether or not the identification number corresponds to a valid identity.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

FIG. 7 is a flow chart showing a method of authenticating a user to a third party;

FIG. 8 is a flow chart showing a further method of authenticating a user to a third party; and FIG. 9 shows a computing device.

DETAILED DESCRIPTION

Embodiments will now be described by way of example only.

Figure 1:
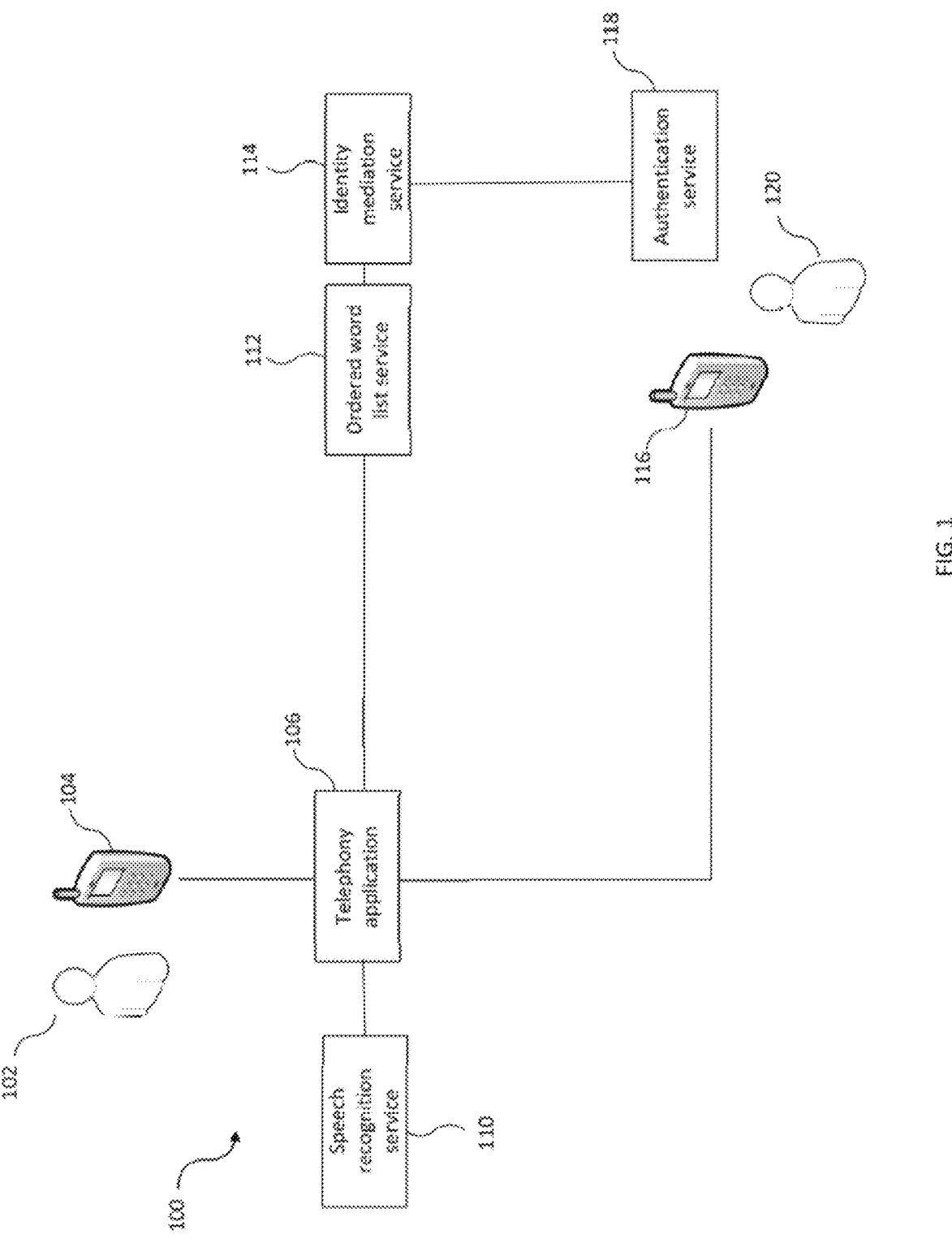
FIG. 1 shows a voice-based communication network.

FIG. 1 shows a communications network 100 comprising a user 102, a user device 104, a telephony application 106, a speech recognition service 110, an ordered word list (OWL) service 112, an identity mediation service 114, an operator 120, an operator device 116, and an authentication service 118.

The operator 120 is generally envisioned to represent a third party to whom the user is to be authenticated.

The functions of the applications and services are generally as follows: the telephony application 106 is an application facilitating voice communication; the speech recognition service is an application capable of attempting to recognise which words are being said during normal speech (i.e. performing automated speech recognition); the OWL service is a service capable of decoding an OWL, for example using methods described below; the identity mediation service 114 is a service for liaising with the authentication service 118; and the authentication service 118 is a service capable of accessing user (e.g. customer) details and identity information, for example by accessing a database.

In operation, the user 102 may use their user device 104 to connect with the network via the telephony application 106. The user device 104 may be any device facilitating voice-based communication. Examples include a telephone (e.g. a smartphone), a laptop, or a tablet. Alternatively, contact may be initiated by the operator 120.

The telephony application 106 establishes a connection between the user device 104 and the operator device 116, thereby putting the user 102 in voice contact (e.g. a phone call) with the operator 120. As an example, the objective of this voice contact may be for the user 102 to request a service from an organisation represented by the operator 120, or may be for the operator 120 to request information from the user 102 in relation to previous or prospective services that may be provided.

Alternatively, the operator 120 may be absent (or not initially involved), and the user 102 may be put into voice communication with an automated voice service of the telephony application 106. For example, the automated voice service may comprise an AI-based voice assistant or virtual agent. This may lead to contact with the operator 120 at a later stage, for example after validation, or the operator 120 may not be involved at all.

In order to authenticate the user 102, the operator 120 may ask the user 102 to verbally provide an identifier. Alternatively, the user 102 may be asked by an automated message to provide the identifier, or may provide the identifier unprompted. Within this disclosure, implementations are generally contemplated wherein the identifier provided by the user 106 comprises one or more words, and in particular is an ordered word list (OWL). More information on the generation and decoding of OWLs is given below with reference to FIGS. 3-5.

The OWL required for authentication may be actively communicated with the user 102 as part of their customer engagement, for example a bill may list both a numeric account number (identification number) and the user 102's "memorable words" (OWL) that the user 102 can use to more easily identify themselves. Another use-case might see the OWL being displayed within an application or on a website as required.

Another possibility would be to use the OWL to communicate a session token for an actively authenticated session. For example, if a user 102 is logged into a website and then needs to speak to an operator 120, the website could present the user 102 with an OWL that could read to the operator 120 in order to authenticate the user 102, synchronize the sessions, and open up a secure channel for communication.

The OWL provided by the user 102 may be recognised by the speech recognition service 110, which attempts to determine which words are in the OWL. This information may be passed from the speech recognition service 110 back to the telephony application 106 for forwarding to the ordered word list service 112. Alternatively, the speech recognition service 110 may provide the OWL directly to the OWL service 112, or to the identity mediation service 114, which may then pass the OWL to the OWL service 112.

Typically, speech recognition systems are able to take an open speech input and provide an n-best list of potential transcriptions along with confidence values for each candidate recognition on the list. It is important when using speech recognition to take every possible step to narrow the candidate list to ensure that the n-best list is as short and as accurate as possible.

The OWL service 112 performs various steps, described below, to confirm that the OWL is valid, and to convert the OWL into an identification number.

Once the OWL service 112 has obtained an identification number, the OWL service 112 passes the identification number to the identity mediation service 114, which communicates to the authentication service 118 to provide the identification number. The authentication service 118 establishes whether the identification number is a valid identification number. For example, the authentication service 118 may determine whether the identification number corresponds to any identification number associated with user records accessible to the authentication service 118. The authentication service 118 then reports to the identity mediation service 114 whether the identification number is valid or not.

If the identification number corresponds to a valid identity, as an additional stage of authentication, it may be desirable to confirm that the user 102 is genuinely associated with the valid identity. For example, this may involve the identity mediation service accessing a voice function of the telephony application 106 in order to output an authentication challenge to the user 102. This authentication challenge may be based on further information associated with the valid identity supplied by the authentication service 118.

The user 102's response to the authentication challenge may be received by the telephony application 106 and returned to the identity mediation service 114 for passing to the authentication service 118. The authentication service 118 may use this information to obtain an authentication result indicating whether or not the user 102 has been authenticated as having the identity represented by the OWL and the identification number.

Once the authentication service 118 has obtained the authentication result, the authentication service 118 may convey this result back to the identity mediation service 114. The authentication result may also be conveyed to the agent 120. For example, the authentication result may be communicated to the agent 120 by either the authentication service 118 or the identity mediation service 114, possibly by displaying an indication of the authentication result on a display of the operator device 116.

In some cases, it may be that the authenticating party (the party providing the OWL service 112 and identity mediation service 114) may also operate the authentication service 118 (any or all of which may then be implemented on a device operated by the authenticating party). Additionally, in some cases the authenticating party may or may not provide the speech recognition service 110 and/or the telephony application 106, which therefore may or may not be implemented on a device of the authenticating party.

In this manner, generally speaking, the authenticating party facilitates authentication of the user 102 to the third party (the organisation of the operator 120).

It will be appreciated that, while the functions and steps described above have been assigned to particular services, these functions may be assigned differently. For example, any of the OWL service 112, the identity mediation service 114, and/or the authentication service 118 may be combined into a single service.

Additionally or alternatively, the network 100 may be implemented partly or entirely using a cloud-based platform or platforms. For example, any or all of the telephony application 106, speech recognition service 110, OWL service 112, identity mediation service 114, and/or authentication service 118 may be implemented on a cloud platform, for example as widgets.

As a further possibility, the operator 120 may receive the OWL from the user 102 via the telephony application 106, then type the received OWL (as heard by the operator 120) into a separate web page implementing the authentication service 118 for authentication. This embodiment requires the minimum of automation.

It will further be appreciated that, in the scheme described above, the authentication service 118 need not necessarily interact with OWLs or require any knowledge of them. Similarly, the user 106 need not necessarily interact with (or even be aware of) the identification number. Rather, the OWL service 112 and identity mediation service 114 provide an intermediary allowing the user 102 to use the OWL and the authentication service 118 to use the identification number.

Figure 2:
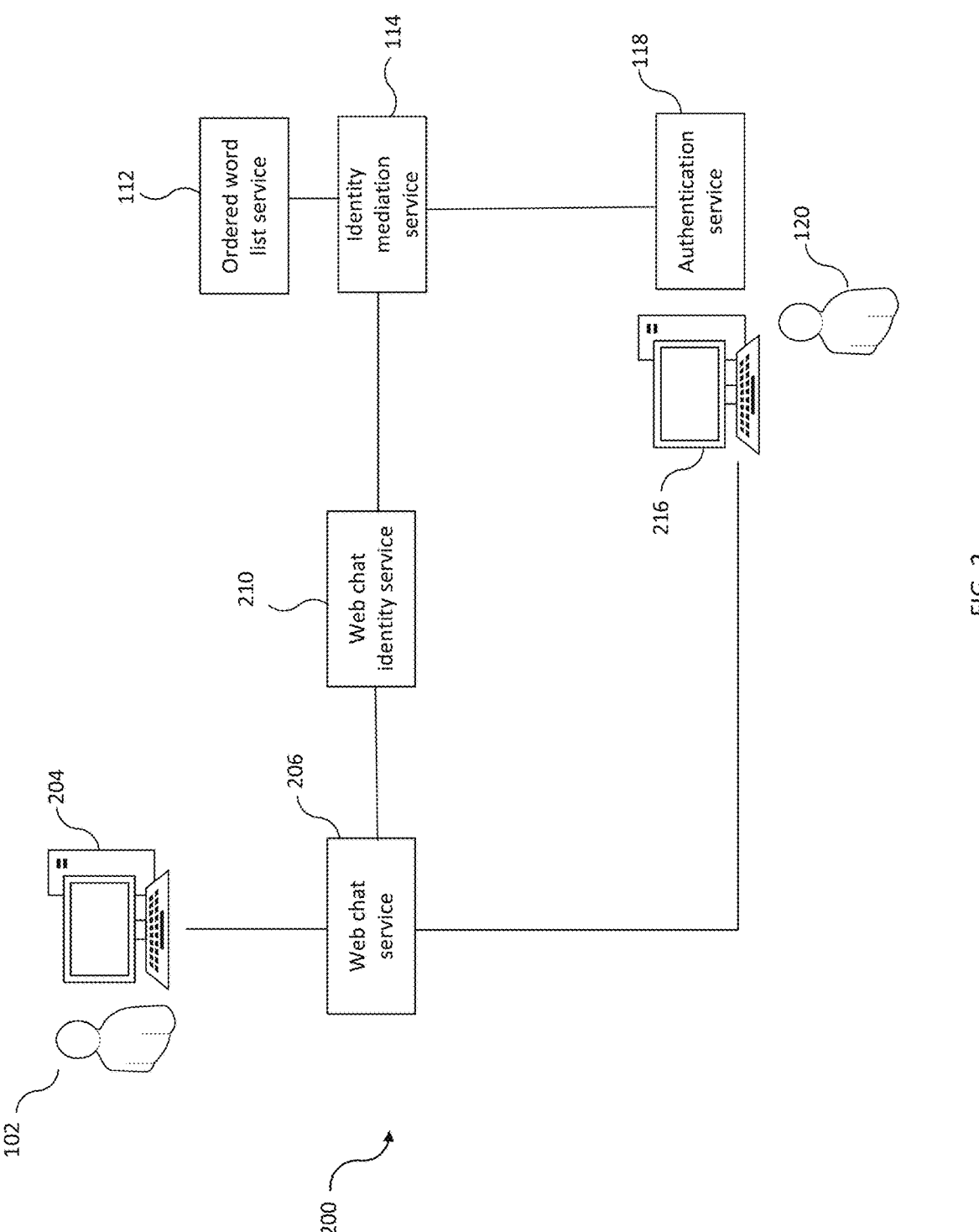
FIG. 2 shows a web-based communication network.

FIG. 2 shows an alternative communications network 200. Many of the features of the network 200 correspond to features of the communications network 100 described above, and corresponding reference signs have been used accordingly.

Rather than voice-based communication, the network 200 is configured to make use of text-based communication. In this regard, the network 200 comprises a web chat service 206 and a web chat identity service 210, as well as a user device 204 and operator device 216 that are configured to use text-based communication.

In embodiments, the web chat service 206 may be provided by the third party and implemented on a device operated by the third party, and/or on a cloud platform. Alternatively, the web chat service 206 may be provided by the authenticating party or the user 102.

The web chat identity service 210 may be integrated into the web chat service 206. Alternatively, the web chat identity service 210 may be a standalone service provided by the authenticating party.

As a further possibility, the web chat identity service may be implemented by intercepting communication between the user device 204 and the web chat service 206. For example, when the user 102 types a message into an interface of the web chat service 206, the web chat identity service 210 may review this message to determine the presence of any potential OWLs before the message is relayed to the operator device 216.

Analogous to the above description of FIG. 1, the web chat service 206 may facilitate text-based communication between the user 102 and the operator 120. The web chat identity service 210 may identify an OWL in messages sent by the user 102, and send this OWL to the OWL service 112 (optionally via the identity mediation service 114 as shown in FIG. 2).

If an authentication challenge is used as described above, the identity mediation service 114 may use the web chat service 206 to output the authentication challenge to the user 102 via text. The user 102 may then provide a text reply to the authentication challenge via the web chat service 206, which may then be provided to the identity mediation service 114.

Otherwise, the operation of the network 200 is generally envisioned to be similar to the operation of the network 100 described above with reference to FIG. 1.

In embodiments, aspects of the operation of the network 200 may be implemented using human agents rather than automation. For example, an authentication challenge may be passed to the user by a human agent, via the web chat service 206 or via any other communication means such as telephone.

Methods relating to the generation and use of OWLs will now be discussed with reference to FIGS. 3-5.

Figure 3:
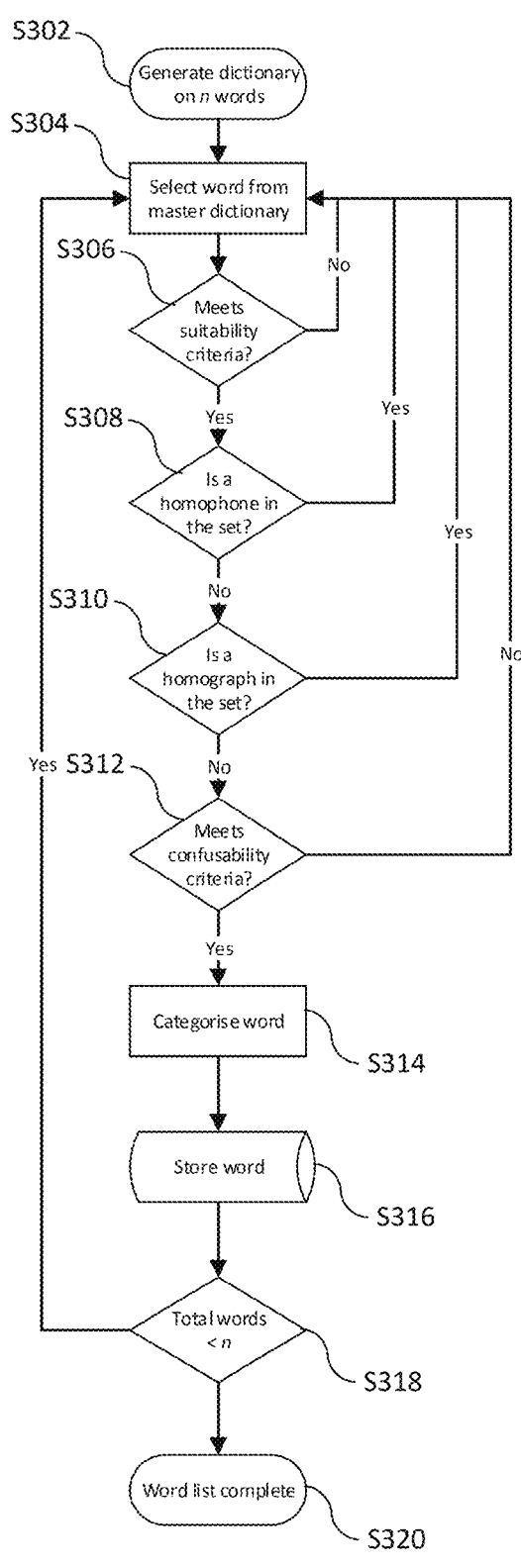
FIG. 3 is a flow chart showing a method of generating a dictionary of words.

FIG. 3 shows an exemplary method 300 of generating a dictionary of words for use in OWLs, otherwise referred to herein as an OWL dictionary.

The method 300 may be carried out by any suitable service or application. For example, the method 300 may be performed by the OWL service 112 of FIG. 1 or 2.

At step S302, the service receives an instruction to generate an OWL dictionary comprising n words for some number n.

At step S304, the service selects a word from a master dictionary. The master dictionary may, for example, be a well-known list of words such as the NATO phonetic alphabet (International Radiotelephony Spelling Alphabet) or the PGP Word List.

Generally speaking, the size of the master dictionary determines the maximum size of the OWL dictionary (that is, the maximum value of n). This in turn determines how many words are required in an OWL to map a certain number of possible identification numbers. For example, the NATO phonetic alphabet contains 26 words. This allows $26^4=456,976$ unique 4-word OWLs to be generated. The PGP word list, on the other hand, has 512 words, so that there are $512^4=68,719,476,736$ unique OWLs.

The choice of master dictionary may therefore be informed by how many words are considered acceptable in each OWL, and how many identification numbers need to be mapped. For example, if 4 words is deemed the maximum acceptable OWL length for a system with 1 million unique identification numbers (e.g. six decimal digits), the NATO phonetic alphabet would not be a suitable choice of master dictionary based on the above numbers, while the PGP word list would.

One use case where larger dictionaries may be appropriate is cryptocurrency wallet addresses, which are often long alphanumeric strings. For example, a 160-bit wallet address can be represented by 12 words from a 12,288-word dictionary.

At step S306, the service determines whether the selected word meets certain suitability criteria. For example, the suitability criteria may require that the word is not a trademark, and/or that the word is not offensive or inappropriate.

If the service determines that the selected word does not meet the suitability criteria, the service discards the selected word and returns to step S304 to select another word. Otherwise, the service proceeds to step S308.

At step S308, the service determines whether the selected word is a homophone to (i.e. has the same pronunciation as) any word already in the OWL dictionary.

If the service determines that the selected word does have a homophone in the OWL dictionary, the service discards the selected word and returns to step S304 to select another word. Otherwise, the service proceeds to step S310.

At step S310, the service determines whether the selected word is a homograph to (i.e. has the same spelling as) any word already in the OWL dictionary.

If the service determines that the selected word does have a homograph in the OWL dictionary, the service discards the selected word and returns to step S304 to select another word. Otherwise, the service proceeds to step S312.

At step S312, the service determines whether the selected word meets certain confusability criteria with respect to any words already stored in the OWL dictionary. The confusability criteria may generally be criteria for determining whether the selected word is likely to be easily confused with any of the words in the OWL dictionary. For example, the confusability criteria may require that the meaning of the selected word is not too similar to the meaning of any word stored in the OWL dictionary.

If the service determines that the selected word does not meet the confusability criteria, the service discards the selected word and returns to step S304 to select another word. Otherwise, the service proceeds to step S314.

It will be appreciated that steps S306 to S312 may be implemented in any order, and that any or all of these steps may be omitted if not required in a particular application.

At step S314, the service may optionally categorise the selected word based on which part of speech the word is. For example, the service may categorise the selected word as a noun, a verb, or an adjective. In some embodiments, this may allow for the eventual generation of OWLs that conform to certain grammatical rules, such as OWLs that form a sentence.

At step S316, the service stores the selected word in the OWL dictionary.

At step S318, the service determines whether the OWL dictionary now has n words. If so, the service proceeds to step S320. If the OWL dictionary still has fewer than n words, the service returns to step S304 to select another word.

At step S320, the service reports that an OWL dictionary of n words has been generated as instructed.

Generally speaking, it is desirable for the OWL dictionary to include word structures and selections which maximize human/machine recognition accuracy and usability constraints to meet defined system performance targets. The OWL dictionary would ideally consist of words which are in common use by both native and non-native speakers and which are easily recognized, read and uttered correctly and are suitable for use in publicly accessed services (i.e. not brand names or offensive words).

Although an OWL dictionary could be created by sequentially selecting then assessing and filtering words from the master dictionary, it should be more efficient to use a non-sequential process, e.g. first classifying all the individual words in the master dictionary using multiple features or attributes to locate each in multi-dimensional space, and then identifying the population of words which maximizes the overall discrimination (both minimum and average distances between all the word feature vectors) using all axes of the feature space. The principal weighting of this distance metric should be phonetic distance/recognition confusability followed by any other lower-weighted dimensions such as word class or semantic content.

The generation/selection of OWL dictionaries should be empirically designed or subsequently assessed and adjusted to achieve maximum discrimination accuracy and user effectiveness by applying theoretical phonetic constraints, usability trials and experimental recognition tests It is generally envisioned that the OWL dictionary will be generated in a language appropriate to the intended application. For example, if the OWL dictionary is intended for generating OWLs for use in authenticating customers of a particular organisation, the working language of that organisation may be used.

Figure 4:
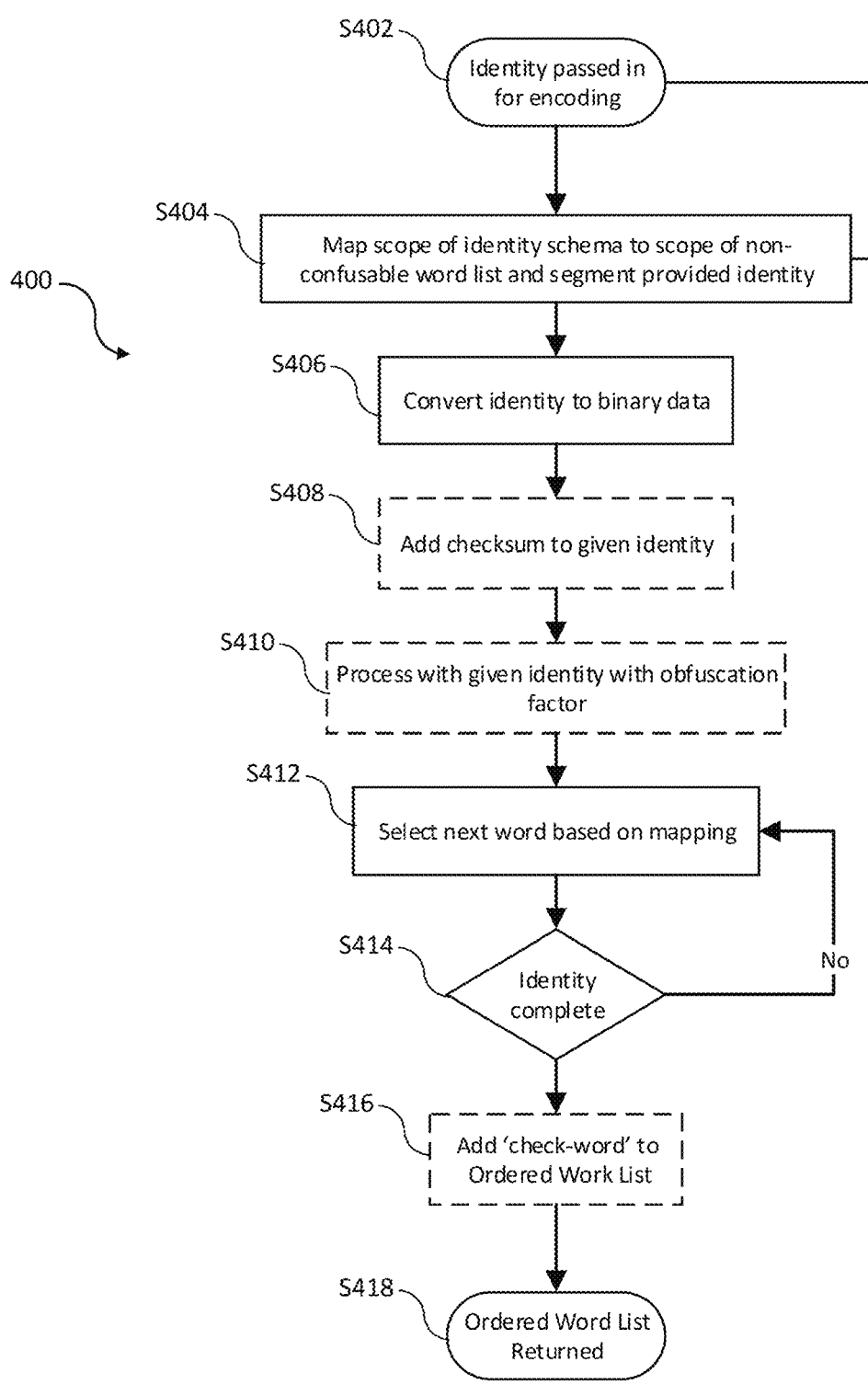
FIG. 4 is a flow chart showing a method of encoding an identifier into an ordered word list (OWL)

FIG. 4 shows an exemplary method 400 for converting an identification number into an OWL (otherwise referred to herein as encoding an OWL). This method may, for example, be carried out by an appropriate service such as the OWL service 112 of FIGS. 1 and 2. The method 400 requires an OWL dictionary, which may be generated by the method 300 described above. The OWL dictionary may already be available, or may be generated as a preliminary step to the method 400.

At step S402, the service receives an identification number for conversion to an OWL (otherwise referred to herein as encoding). This step may be performed when the identification number is originally generated, for example upon registration of a new customer.

At step S404, the service calculates how many words are required in the OWL in order to cover all possible identification numbers of the relevant identity schema, given the number of words in the OWL dictionary. For example, if the identification number comprises six decimal digits, that allows 1 million possible identification numbers. If the OWL dictionary comprises 1,000 or more words, a two-word OWL is sufficient to cover this range. Alternatively, it will be appreciated if the OWL dictionary has fewer than 1,000 words, more words will accordingly be required in the OWL.

It is noted that the identification number may contain digits that do not need to be fully mapped by the range of possible OWLs. For example, the first two digits of a two-digit alphanumeric identification number may always be the same, e.g. "JD". In that case, the six-digit identification number may be treated as a four-digit identification number. Additionally or alternatively, certain digits of an identification number may take a reduced range of values. For example, the last digit may always be either 0 or 1, such that the number of possible identification numbers is reduced accordingly.

At step S406, the service converts the identification number to binary data (otherwise referred to herein as a binary representation of the identification number). If the identification number is purely a number, this may be done by simply expressing the same number in binary. If the identification number comprises letters and/or other characters, this may be done using any conversion scheme such as ASCII or Unicode.

The binary representation of the identification number is divided into a number of segments equal to the number of required words determined at step S404. In the above example of 1,000 OWL dictionary words and 1 million possible identification numbers, the binary representation of the identification number will be divided into two segments with equal numbers of bits (or as close as possible to equal if the number of bits is odd).

At step S408, the service may optionally add a checksum to the binary representation of the identification number. This checksum may form a new segment of the binary representation, or may be added to an existing segment.

At step S410, the service may optionally perform a cryptographic function such as salting the binary representation and/or encrypting the binary representation.

The term obfuscation factor or encryption factor is used herein to refer to any process that obfuscates the OWL, including but not limited to encryption, salting, and hashing. The removal of the obfuscation caused by an obfuscation factor is referred to herein as "decoding".

To provide enhanced security, an obfuscation factor may be used that is specific to the user, the third party, and/or the specific communication session. Additionally or alternatively, the obfuscation factor may change periodically, remaining valid only for a predetermined time window.

As an example, the identification number may be salted by adding additional information to the identification number, such as e.g. appending a phone number of the user to the identification number and/or performing an XOR of a binary representation of the user's phone number with the binary representation of the identification number. In this example, the phone number would be referred to as the obfuscation factor. Where salting is used, it may be necessary to store the salted identification number for later reference.

As a further example, the binary representation of the identification number may be encrypted with a symmetric algorithm such as AES256, an asymmetric algorithm such as elliptic curve encryption, or another process such as homomorphic encryption. The encryption process may involve adding a numerical checksum to the binary representation of the identification number.

Notably, homomorphic encryption may allow for later validation of an encrypted OWL without requiring decryption. For example, this may be accomplished using zero-knowledge proofs.

In embodiments, steps S404-S410 may be performed in different orders. For example, in some applications the identification number may be salted before binary conversion, or the checksum may be added after encryption. Additionally or alternatively, step S404 may be carried out after adding the obfuscation factor.

At step S412, the service takes the first segment of the binary identification number and maps it to a word in the OWL dictionary. This may be done simply by indexing each position in the OWL dictionary, and choosing the word with an index equal to the value of the first segment.

At step S414, the service determines whether there are any more segments to map to words. If so, the service returns to step S412 to map the next segment. Otherwise, the service advances to step S416.

At step S416, the service may optionally add an additional word to the OWL to serve as a "check-word" (analogous to a checksum). For example, in the case described above with a six-digit identification number and 1,000 word OWL dictionary, the two-word OWL will be expanded to three words by adding the check-word.

One way of adding a check-word is to XOR the binary values of two segments to obtain a checksum. This checksum can then be looked up in the OWL dictionary in the same manner as described above to find the corresponding check-word.

The check-word may added at the end of the OWL, or at any other position.

The role of the check-word in verification will be described below with reference to step S512 of FIG. 5.

Alternatively or additionally to using a check-word, the service may use an alternative verification mechanism such as Luhn checking, any known Error Correction Code, or Forward Error Correction.

At step S418, the service returns the finished OWL.

In some implementations, an optional further step in preparing the OWL may be to sub-divide the OWL into sub-groups of words. For example, a 12-word OWL may be sub-divided into groups of 3 words.

Additionally or alternatively, there may be provisions to order the words of the OWL to increase recognisability. In British English, for example, OWLs following the OPSASHCOMP order (OPinion, Size, Age, SHape, Colour, Origin, Material and Purpose) may be easier to remember.

Additionally or alternatively, it may be desirable to have the OWL form a sentence, for example by adding additional conjoining words to fit the grammatical rules of the relevant language.

Figure 5:
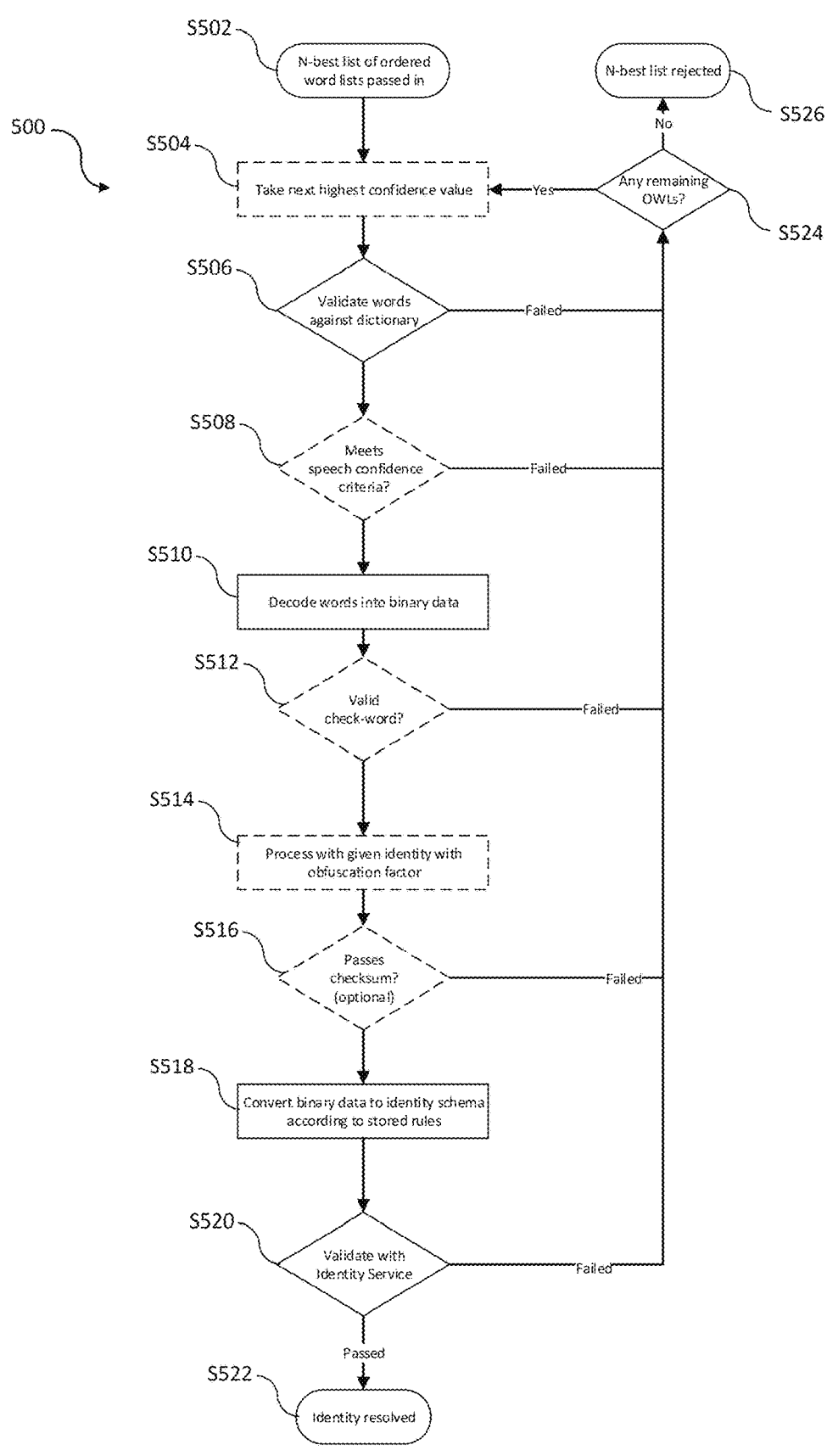
FIG. 5 is a flow chart showing a method of decoding an OWL to retrieve an identifier.

FIG. 5 shows an exemplary method 500 of converting an OWL into an identification number (otherwise referred to herein as decoding an OWL). This method may, for example, be carried out by the OWL service 112 of FIG. 1.

Generally speaking, the method 500 is expected to be used in a context where the service knows which method should have been used to generate the OWL if the OWL is valid. For example, the method 400 described above may be expected to have been used. It will be noted that several steps of the method 400 are optional, such as encryption or adding a check-word. It is generally envisioned that the service will be aware which (if any) optional steps are supposed to have been used, and will attempt to decode the OWL on the basis of those steps as described below.

For example, it may be that when generating OWLs for a particular third party, the user's phone number is used as an obfuscation factor and a check-word is added. In that case, if the service is asked to decode an OWL associated with that third party (i.e. used during a communication session with that third party), it will assume that one of the words in the OWL is a check-word and expect to use the user's phone number for decryption. If the OWL is associated with a different third party, the service may make different assumptions appropriate to that third party.

At step S502, the service may receive a list of best guesses as to the OWL spoken aloud by the user 102. It is envisioned that this will be passed by a speech recognition service such as the speech recognition service 110 of FIG. 1.

It will be appreciated that this description of step S502 is specific to the voice-based implementation of FIG. 1. In the text-based implementation of FIG. 2, the service may simply receive the OWL typed by the user, not a list of candidate OWLs determined by speech recognition. In this case, the words will still be validated and decoded as described below with regard to steps S506-S522.

At step S504, the service selects the highest-confidence guess provided by the speech recognition service that has not been ruled out by any of the below steps. For ease of reference, this highest-confidence guess will be referred to as the "candidate OWL".

It will be appreciated that, in a text-based implementation where only a single OWL is provided at step S502, step S504 simply requires selecting this single OWL as the candidate OWL. Step S504 may therefore be regarded as optional, as confidence values will not be applicable in all implementations.

It is noted that, in a text-based implementation, text correction techniques may be applied to the input text supplied by the user. This has the advantage that OWLs composed of words can be corrected to remove e.g. typographical errors whereas errors in an ID number or other numerical sequence cannot be corrected in this way.

At step S506, the service determines whether or not all the words in the candidate OWL are in the OWL dictionary. If so, the service proceeds to step S508. If not, the service proceeds to step S524.

At step S508, the service may optionally determine whether the confidence value provided by the speech recognition service meets a predetermined confidence threshold. For example, the service may require that the candidate OWL has a reported confidence value of at least 80%. It will be appreciated that this step is not applicable in text-based implementations.

If the confidence threshold is met, the service proceeds to step S510. If not, the service proceeds to step S524.

At step S510, the service converts the words in the OWL into binary data. For example, this may be done using the OWL dictionary by converting each word into the binary representation of the index of that word in the dictionary.

At step S512, if the service is expecting a check-word (described at step S416 above), it treats the expected word in the OWL as a check-word and determines whether the check-word is valid.

For example, this may be done by performing an XOR on the binary representations of two words that are expected to have been XORed to form the check-word at step S416. If the result matches the binary representation of the presumed check-word, the service removes the check-word from the OWL and proceeds to step S514. Otherwise, the service proceeds to step S524.

It will be appreciated that if no check-word is expected step S512 will be skipped, and is therefore an optional step.

At step S514, if the service is expecting the OWL to have been encrypted, the service will take appropriate steps to decrypt the binary representation of the OWL and/or remove the obfuscation factor. If the service expects the original identification number to have been salted the salt may not be removed, but rather the identification number obtained from the OWL may be compared to a salted version of the identification number stored previously (as mentioned above with reference to step S410).

For example, if the service is expecting the user's phone number to have been appended to the original identification number as an obfuscation factor as suggested above, the service will remove bits corresponding to a binary representation of the user's phone number from the binary identification number.

As a further example, if the service is expecting the binary representation of the identification number to have been encoded with an algorithm such as AES256, elliptic curve encryption, or homomorphic encryption, the service will decrypt the binary representation using the expected algorithm.

At step S516, if a numerical checksum was added during the encryption process (instead of or in addition to a check-word), the validity of this numerical checksum is checked.

At step S518, the service converts the binary data into an identification number by the reverse of the methods described above at step S406.

At step S520, the service passes the identification number for validation. For example, in the system 100 of FIG. 1, this may be done by passing the identification number to the identity mediation service 114 for forwarding to the authentication service 118. The authentication service may then report to the identity mediation service 114 whether the identification number is a valid identification number (i.e. whether the identification number corresponds to a valid identity).

In some implementations, upon reaching step S520 the service may continue to evaluate the rest of the guesses in the list to see whether they appear valid up to this point of the method 500. If there are multiple seemingly valid identification numbers, the service may pass all of them for validation.

In the event that the identification number is found to correspond to a valid identity, step S522 represents the conclusion that the task is complete. Depending on the precise implementation, this may or may not be reported back to the service executing method 500.

If the identification number is found not to correspond to a valid identity, this will be reported back to the service (for example, by the identity mediation service 114) and the service will proceed to step S524.

Step S524 is reached if the candidate OWL is found to be incorrect at any of the above steps. In this case, if the service was provided with a list of guesses at step S502 as described above, the service discards the candidate OWL and returns to step S504 to select the remaining OWL with the highest confidence value as the new candidate OWL.

If there are no OWLs left in the list, or if only one OWL was provided originally (for example, in a text-based implementation), the service proceeds to step S526.

At step S526, the service concludes that the authentication process has failed and rejects the list of OWL guesses. In this eventuality, a provision may be made to inform the user and/or operator of this failure, and either give the user another opportunity to provide a correct OWL, or terminate the authentication process.

Figure 6:
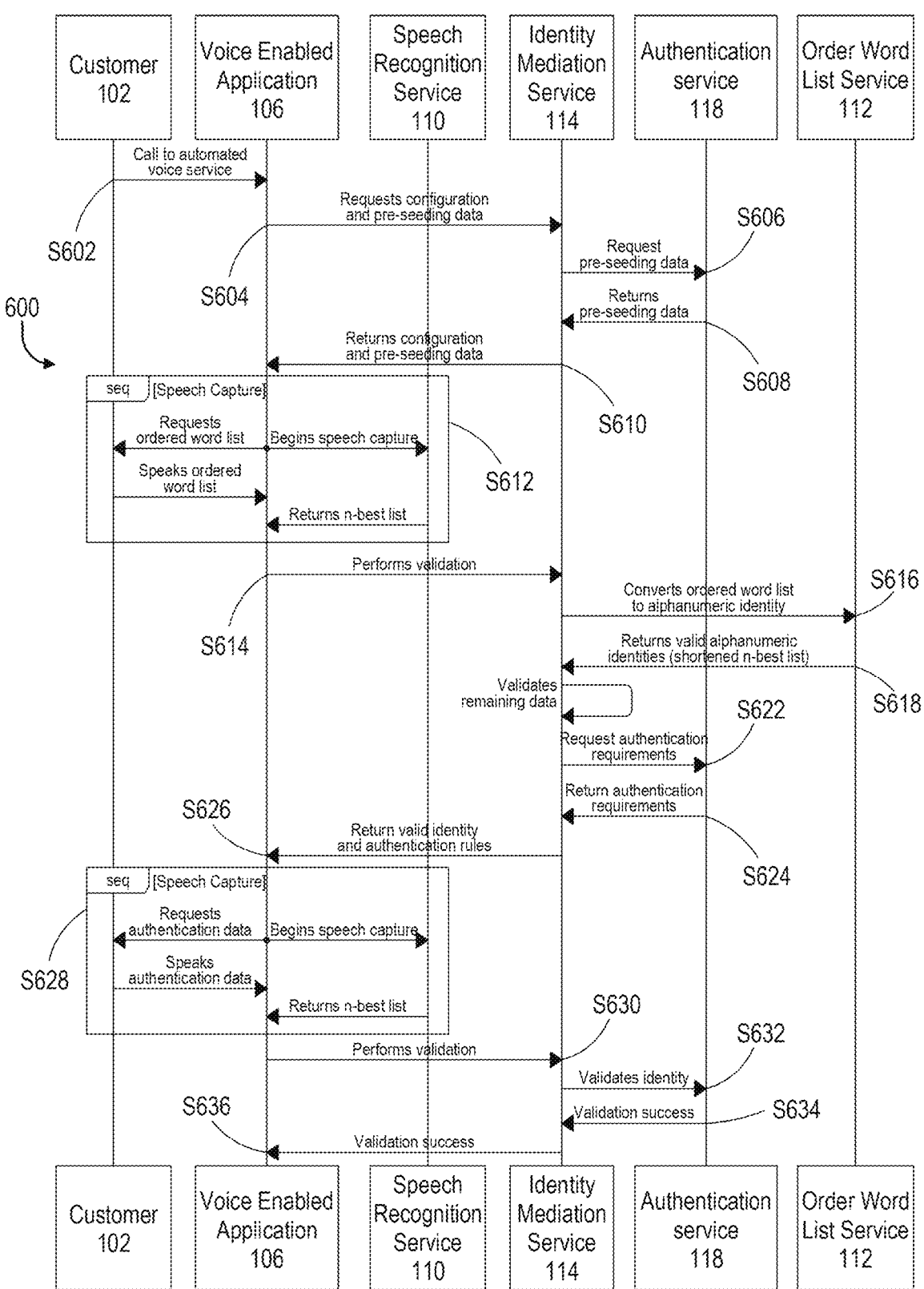
FIG. 6 shows a process of authenticating a user to a third party.

FIG. 6 is a process diagram showing an exemplary operation 600 of the system 100 described above.

The user/customer 102, telephony application/voice enabled application 106, speech recognition service 110, identity mediation service 114, authentication service 118, and OWL service 112 are given corresponding labels to those used in FIG. 1.

At step S602, the user 102 initiates a call to the third party. This call is received by the telephony application 106, which in this example operates an automated voice service to respond to the user 102. (As noted above with regard to FIG. 1, other implementations may use an operator 120.)

At step S604, the telephony application 106 contacts the identity mediation service 114 to request configuration data and pre-seeding data.

Configuration data may, for example, include any or all of the number of words expected to be in an OWL for the third party; a language that the OWL will be in; or an identification of which OWL dictionary should be used if more than one OWL dictionary is available.

Pre-seeding data may be data that is used to seed the speech recognition service 110 to increase the chance of correctly recognising what the user 102 is saying. For example, the speech recognition service 110 may be seeded with the phone number of the user 102, and/or an IP address or device identifier of a device operating the telephony application 106. Additionally or alternatively, the speech recognition service can be seeded with the OWL dictionary.

At step S606, the identity mediation service 114 may contact the authentication service 118 to request the pre-seeding data that was requested by the telephony application 106.

At step S608, the authentication service 118 may then provide the pre-seeding data to the identity mediation service 114.

At step S610, the identity mediation service 114 provides the configuration data and the pre-seeding data to the telephony application 106.

At step S612, the telephony application 106 generates automated speech to request the user 102 to recite their OWL. The telephony application also instructs the speech recognition service to begin capturing speech. The user 102 speaks their OWL aloud, and the speech recognition service 110 attempts to recognise the words that are spoken. The speech recognition service 110 then returns to the telephony application 106 a list of best guesses at the OWL that the user 102 spoke aloud (i.e. candidate OWLs).

At step S614, the telephony application 106 provides the list of guesses to the identity mediation service 114. The identity mediation service 114 may at this stage perform any preliminary validation steps. For example, the identity mediation service 114 may check whether each word in each guess is in the expected OWL dictionary, and exclude any guesses that contain any words that are not in the OWL dictionary. Additionally or alternatively, if the OWL is expected to include a check-word, the identity mediation service 114 may exclude any guesses that do not have a valid check-word.

At step S616, the identity mediation service 114 provides the list of guesses (without any guesses removed at step S614) to the OWL service 112. The OWL service 112 obtains an identification number from the list of guesses, for example by the method 500 described above (not including step S520 which is performed below).

At step S618, the OWL service 112 returns the obtained identification number to the identity mediation service 114. In some cases, it may be that several entries in the list of guesses correspond to seemingly valid identification numbers (e.g. correspond to words in the OWL dictionary and have valid check-words). In that case, the OWL service 112 may return all such seemingly valid identification numbers to the identity mediation service 114.

At step S620, the identity mediation service 114 performs any remaining validation steps. For example, the identity mediation service 114 may validate a numerical checksum included in a binary representation of the identification number.

At step S622, the identity mediation service 114 contacts the authentication service 118 to request confirmation of whether the identification number (or numbers, if more than one is found to be potentially valid) correspond to valid identities.

In the example of FIG. 6, the identity mediation service 114 further requests additional authentication requirements for authenticating that the user 102 genuinely has the identity that the identification number corresponds to. For example, the identity mediation service 114 may request information that is suitable for using as an authentication challenge to the user 102 (e.g. requesting the user's address, postcode, date of birth, or similar), and the authentication service 118 may respond by providing such information.

At step S624, the authentication service 118 responds to the identity mediation service 114 by providing an indication of whether or not the identification number corresponds to a valid identity. If multiple identification numbers were provided, the authentication service 118 may indicate which of them (if any) correspond to valid identities.

If the identification number corresponds to a valid identity, and if the identity mediation service 114 further requested additional authentication requirements, the authentication service 118 also provides the further authentication requirements to the identity mediation service 114.

The following steps of the operation 600 are specific to the optional implementation wherein additional authentication requirements are requested and provided.

At step S626, the identity mediation service 114 contacts the telephony application 106 to provide the further authentication requirements. These may, for example, be in the form of an authentication challenge to be passed on to the user 102.

At step S628, the telephony application 106 once again uses the speech recognition service 110 to perform speech capture.

The telephony application 106 uses automated speech to output the authentication challenge to the user 102, and instructs the speech recognition service 110 to begin speech capture. The user 102 verbally responds to the authentication challenge. The speech recognition service 110 returns a list of best guesses as to what the user 102 said.

At step S630, the telephony application 106 provides the list of guesses to the identity mediation service 114.

At step S632, the identity mediation service 114 provides one or more of the guesses to the authentication service 118, which confirms whether any of the guesses is a correct answer to the authentication challenge. For example, this may be performed by comparing the list of guesses to the additional authentication requirements stored in memory accessible to the authentication service 118.

For example, the identity mediation service 114 may provide only the guess with the highest confidence assigned by the speech recognition service 110. Alternatively, if the identity mediation service 114 has information about the expected answer (for example, if the expected answer is a postcode), the identity mediation service 114 may first filter the list of guesses (for example, by removing any that are not valid postcodes) before providing the highest confidence guess to the authentication service 118.

At step S634, the authentication service 118 sends the identity mediation service an indication of whether or not the authentication challenge was correctly answered, and therefore whether or not the user has been successfully authenticated as being associated with the valid identity. If the answer is incorrect and there are further guesses that have not yet been sent to the authentication service 118, the identity mediation service 114 may send a further guess (for example, the guess with the next highest confidence).

At step S636, the identity mediation service 114 transmits to the telephony application 106 an indication of whether or not the user has been successfully authenticated. The telephony application 106 may then take appropriate action such as informing the user 102 of the outcome of authentication using automated speech. Additionally or alternatively, if authentication was successful, the telephony application 106 may ask the user 102 what service they desire, and/or pass the user 102 to a human operator 120.

In an alternative implementation, at step S624 the authentication service 118 may provide to the identity mediation service 114 both the authentication challenge and the correct answer to the authentication challenge. In that case, at step S630, the identity mediation service 114 may compare the list of guesses provided by the speech recognition service 110 to the correct answer rather than providing any guesses to the authentication service 118. Steps S632 and S634 may then be omitted.

It will be appreciated that a closely analogous process applies to the system 200, but with the web chat service 206 filling the role of the telephony application 106. Communication with the user 102 at steps S602, S612, S628, and S636 is then text-based rather than voice based. For example, user 102 may be requested by text to supply the OWL, which they may then do by typing the OWL. Similarly, the authentication challenge may be issued and answered by text.

FIG. 7 shows a method 700 of authenticating a user to a third party. With reference to FIG. 1 above, the method 700 may be seen as corresponding to an embodiment wherein the authentication service 118 is owned and operated by the third party, not by the provider of the OWL service 112 and identity mediation service 114.

It will be appreciated that the steps of the method 700 generally correspond to steps identified above as being performed by the OWL service 112 and identity mediation service 114 of FIGS. 1 and 2.

At step S702, the method comprises receiving an input from the user, the input comprising one or more words. The input may be text-based and forwarded by a web chat identity service 210, or may be voice-based and forwarded by a telephony application 106 as a list of best guesses of what the user said. This step may broadly correspond to step S614 of FIG. 6 as described above. In particular, this step may be performed by the identity mediation service 114.

At step S704, the method comprises obtaining an identification number corresponding to the one or more words. This step may broadly correspond to steps S616 and S618 of FIG. 6 as described above, and may be accomplished by the method 500 of FIG. 5. In particular, this step may be performed by the OWL service 112.

At step S706, the method comprises transmitting the identification number to a third party device associated with the third party. The third party device may be a device implementing the authentication service 118 of FIGS. 1 and 2. This step may broadly correspond to step S622 of FIG. 6 described above. In particular, this step may be performed by the identity mediation service 114.

At step S708, the method comprises receiving a message from the third party device, the message comprising an indication of whether or not the identification number corresponds to a valid identity. This step may broadly correspond to step S624 of FIG. 6 as described above. In particular, this step may be performed by the identity mediation service 114.

FIG. 8 shows a method 800 of authenticating a user to a third party. With reference to FIG. 1 above, the method 700 may be seen as corresponding to an embodiment wherein the authentication service 118 is operated by the provider of the OWL service 112 and identity mediation service 114, not by the third party.

It will be appreciated that the steps of the method 800 generally correspond to steps identified above as being performed by the OWL service 112, identity mediation service 114, and authentication service 118 of FIGS. 1 and 2.

At step S802, the method comprises receiving an input from the user, the input comprising one or more words. The input may be text-based and forwarded by a web chat identity service 210, or may be voice-based and forwarded by a telephony application 106 as a list of best guesses of what the user said. This step may broadly correspond to step S614 of FIG. 6 as described above. In particular, this step may be performed by the identity mediation service 114.

At step S804, the method comprises obtaining an identification number corresponding to the one or more words. This step may broadly correspond to steps S616 and S618 of FIG. 6 as described above, and may be accomplished by the method 500 of FIG. 5. In particular, this step may be performed by the OWL service 112.

At step S806, the method comprises comparing the identification number to data stored in a memory accessible to the at least one computing device. This step may broadly correspond to step S624 of FIG. 6 as described above. In particular, this step may be performed by the authentication service 118.

At step S808, the method comprises, based on the comparing, transmitting to the third party an indication of whether or not the identification number corresponds to a valid identity. For example, the indication may be transmitted to the operator device 116, 216 of FIGS. 1 and 2. This step may be performed by the identity mediation service 114.

FIG. 9 shows a computing device 900 that may be suitable for implementing various aspects of the disclosure. The computing device 900 comprises a processor 902, a communication interface 904 for communicating with other entities, and a memory 906. As shown in the figure, the processor 902 may be configured to run one or both of the OWL service 112 and identity mediation service 114 referred to herein.

In particular, the processor 902 may be configured to perform a method comprising receiving an input from the user, the input comprising one or more words; obtaining an identification number corresponding to the one or more words; transmitting the identification number to a third party device associated with the third party; and receiving a message from the third party device, the message comprising an indication of whether or not the identification number corresponds to a valid identity.

The input from the user may be received from the speech recognition service 110 and/or web chat identity service 210 described above via the communication interface 904. The step of obtaining an identification number corresponding to the one or more words may be performed using the method 500 described above with reference to FIG. 5. The steps of receiving an input from the user, transmitting the identification number to a third party device, and receiving a message from the third party device may be accomplished using the communication interface 904.

In some cases, the processor 902 may also execute the authentication service 118. In these cases, user information necessary for the authentication service 118 may be stored in the memory 906, or may be stored in other memory accessible to the processor 902. Whilst a single processor 902 is show in FIG. 9 for simplicity, it will be appreciated that multiple processors 902 may be implemented to perform the functionality of the OWL service 112, the identity mediation service 114, and optionally the authentication service 118.

In such cases, the processor 902 may be configured to perform a method comprising receiving an input from the user, the input comprising one or more words; obtaining an identification number corresponding to the one or more words; comparing the identification number to data stored in a memory accessible to the at least one computing device; and based on the comparing, transmitting to the third party an indication of whether or not the identification number corresponds to a valid identity.

Again, the input from the user may be received from the speech recognition service 110 and/or web chat identity service 210 described above via the communication interface 904. The step of obtaining an identification number corresponding to the one or more words may be performed using the method 500 described above with reference to FIG. 5. The memory accessible to the device may be the memory 906. The step of transmitting the indication to the third party may be accomplished using the communication interface 904.

Generally, any of the functions described herein can be implemented using software, firmware, hardware (e.g., fixed logic circuitry), or a combination of these implementations. The terms "service" and "application" as used herein generally represent software, firmware, hardware, or a combination thereof. In the case of a software implementation, the service or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Other aspects of the disclosure may be appreciated from the following clauses:

E1. A method of authenticating a user to a third party, the method performed by at least one computing device and comprising:

receiving an input from the user, the input comprising one or more words;

obtaining an identification number corresponding to the one or more words;

comparing the identification number to data stored in a memory accessible to the at least one computing device; and based on the comparing, transmitting to the third party an indication of whether or not the identification number corresponds to a valid identity.

E2. The method of clause E1, wherein, if the indication indicates that the identification number is valid, the method further comprises:

outputting an authentication challenge for the user, the authentication challenge based on data stored in the memory;

receiving a user response to the authentication challenge;

comparing the user response to the data stored in the memory; and based on the comparing, transmitting to the third party a further indication of whether or not the user has been successfully authenticated as being associated with the valid identity.

E3. The method of any preceding clause, wherein obtaining the identification number comprises processing the one or more words and an obfuscation factor.

E4. The method of clause E3, wherein the obfuscation factor is dependent on an identity of the third party.

E5. The method of clause E3 or E4, wherein the obfuscation factor is dependent on an identity of the user.

E6. The method of any of clauses E3 to E5, wherein the obfuscation factor is unique to a particular communication session between the user and the third party.

E7. The method of any of clauses E3 to E5, wherein the obfuscation factor is valid for a predetermined time window.

E8. The method of any preceding clause, wherein the input comprises an automated speech recognition result recorded during a communication session between the user and the third party.

E9. The method of clause E8, wherein the method further comprises determining that the automatic speech recognition result meets predetermined confidence criteria.

E10. The method of any preceding clause, wherein the input comprises text.

E11. The method of any preceding clause, wherein the input is provided by the user during a communication session with the third party.

E12. The method of clause E11, wherein the communication session is a voice-based communication session.

E13. The method of clause E11, wherein the communication session is an instant messaging communication session.

E14. The method of any preceding clause, wherein the method further comprises evaluating a checksum associated with the list of words to determine whether or not the list of words corresponds to a valid identification number.

E15. The method of any preceding clause, wherein obtaining the identification number comprises confirming that each word in the list of words appears in a predetermined set of words stored in a memory accessible by the computing device, wherein the predetermined set of words is in compliance with one or more predefined criteria.

E16. The method of clause E15, wherein one of the predefined criteria is that the predetermined set of words lacks homophones.

E17. The method of clause E15 or E16, wherein one of the predefined criteria is that the predetermined set of words lacks homographs.

E18. A computing device for authenticating a user to a third party, the computing device comprising a processor configured to:

receive an input from the user, the input comprising one or more words;

obtain an identification number corresponding to the one or more words;

compare the identification number to data stored in a memory accessible to the at least one computing device; and based on the comparing, transmit to the third party an indication of whether or not the identification number corresponds to a valid identity.

E19. A computer program for authenticating a user to a third party, the computer program containing instructions that, when executed by a processor of a computing device, cause the computing device to:

receive an input from the user, the input comprising one or more words;

obtain an identification number corresponding to the one or more words;

compare the identification number to data stored in a memory accessible to the at least one computing device; and based on the comparing, transmit to the third party an indication of whether or not the identification number corresponds to a valid identity.

21

The invention claimed is:

1. A method of authenticating a user to a third party, the method performed by at least one computing device and comprising:

receiving an input from the user via a communication interface of the at least one computing device, the input comprising one or more words;

processing the one or more words and an obfuscation factor using a processor of the at least one computing device to obtain an identification number corresponding to the one or more words, wherein obtaining the identification number comprises confirming that each of the one or more words appears in a predetermined set of words stored in a memory accessible by the at least one computing device, wherein the predetermined set of words is in compliance with one or more predefined criteria; wherein the obfuscation factor is either (i) dependent on an identity of the third party; (ii) unique to a particular communication session between the user and the third party; or (iii) valid for a predetermined time window, wherein the obfuscation factor is used to encrypt, salt, or hash the one or more words such that the one or more words cannot be reliably reobtained from the identification number without using the obfuscation factor;

evaluating a checksum associated with the one or more words to determine whether or not the one or more words corresponds to a valid identification number;

transmitting the identification number via the communication interface to a third party device associated with the third party via a communications network; and receiving a message from the third party device via the communication interface via the communications network, the message comprising an indication of whether or not the identification number corresponds to a valid identity;

wherein, when the indication indicates that the identification number is valid, the method further comprises:

outputting an authentication challenge for the user, the authentication challenge based on information included in the message from the third party device;

receiving a user response to the authentication challenge;

transmitting the user response to the third party device; and receiving a further message from the third party device, the further message comprising a further indication of whether or not the user has been successfully authenticated as being associated with the valid identity.

2. The method of claim 1, wherein the obfuscation factor is dependent on an identity of the user.

3. The method of claim 1, wherein the input comprises an automated speech recognition result recorded during a communication session between the user and the third party.

4. The method of claim 3, wherein the method further comprises determining that the automatic speech recognition result meets predetermined confidence criteria.

5. The method of claim 1, wherein the input comprises text.

6. The method of claim 1, wherein the input is provided by the user during a communication session with the third party.

7. The method of claim 6, wherein the communication session is a voice-based communication session.

8. The method of claim 6, wherein the communication session is an instant messaging communication session.

9. The method of claim 1, wherein one of the predefined criteria is that the predetermined set of words lacks homophones.

10. The method of claim 1, wherein one of the predefined criteria is that the predetermined set of words lacks homographs.

11. A computing device for authenticating a user to a third party, the computing device comprising a processor configured to:

receive an input from the user, the input comprising one or more words;

obtain an identification number corresponding to the one or more words by processing the one or more words and an obfuscation factor, wherein obtaining the identification number comprises confirming that each of the one or more words appears in a predetermined set of words stored in a memory accessible by the computing device, wherein the predetermined set of words is in compliance with one or more predefined criteria, wherein the obfuscation factor is either (i) dependent on an identity of the third party; (ii) unique to a particular communication session between the user and the third party; or (iii) valid for a predetermined time window, wherein the obfuscation factor is used to encrypt, salt, or hash the one or more words such that the one or more words cannot be reliably reobtained from the identification number without using the obfuscation factor;

evaluate a checksum associated with the one or more words to determine whether or not the one or more words corresponds to a valid identification number;

transmit the identification number to a third party device associated with the third party via a communications network; and receive a message from the third party device via the communications network, the message comprising an indication of whether or not the identification number corresponds to a valid identity;

wherein, when the indication indicates that the identification number is valid, the processor is further configured to:

output an authentication challenge for the user, the authentication challenge based on information included in the message from the third party device;

receive a user response to the authentication challenge;

transmit the user response to the third party device; and receive a further message from the third party device, the further message comprising a further indication of whether or not the user has been successfully authenticated as being associated with the valid identity.

12. A non-transitory computer-readable medium containing instructions stored thereon that, when executed by a processor of a computing device, cause the computing device to:

receive an input from the user, the input comprising one or more words;

obtain an identification number corresponding to the one or more words by processing the one or more words and an obfuscation factor, wherein obtaining the identification number comprises confirming that each of the one or more words appears in a predetermined set of words stored in a memory accessible by the computing device, wherein the predetermined set of words is in compliance with one or more predefined criteria, wherein the obfuscation factor is either (i) dependent on an identity of the third party; (ii) unique to a particular communication session between the user and the third party; or (iii) valid for a predetermined time window, wherein the obfuscation factor is used to encrypt, salt, or hash the one or more words such that the one or more words cannot be reliably reobtained from the identification number without using the obfuscation factor;

evaluate a checksum associated with the one or more words to determine whether or not the one or more words corresponds to a valid identification number;

transmit the identification number to a third party device associated with the third party via a communications network; and receive a message from the third party device via a communications network, the message comprising an indication of whether or not the identification number corresponds to a valid identity;

wherein, when the indication indicates that the identification number is valid, the instructions further cause the computing device to:

output an authentication challenge for the user, the authentication challenge based on information included in the message from the third party device;

receive a user response to the authentication challenge;

transmit the user response to the third party device; and receive a further message from the third party device, the further message comprising a further indication of whether or not the user has been successfully authenticated as being associated with the valid identity.

* * * * *